United States Patent [19]

Vijayan et al.

[11] Patent Number: 5,366,634
[45] Date of Patent: Nov. 22, 1994

[54] WASTE TREATMENT PROCESS FOR REMOVAL OF CONTAMINANTS FROM AQUEOUS, MIXED-WASTE SOLUTIONS USING SEQUENTIAL CHEMICAL TREATMENT AND CROSSFLOW MICROFILTRATION, FOLLOWED BY DEWATERING

[75] Inventors: Sivaraman Vijayan, Deep River; Chi F. Wong, Pembroke; Leo P. Buckley, Deep River, all of Canada

[73] Assignee: The United States of America as represented by the United States Department of Energy, Washington, D.C.

[21] Appl. No.: 935,328

[22] Filed: Aug. 26, 1992

[51] Int. Cl.$^5$ .............................................. C02F 9/00
[52] U.S. Cl. ...................... 210/638; 210/639; 210/651; 210/665; 210/669; 210/682; 210/688; 210/694
[58] Field of Search ............... 210/638, 639, 665, 667, 210/669, 682, 687, 688, 694, 651

[56] References Cited

U.S. PATENT DOCUMENTS 4,313,830  2/1982  Tulin et al. ........................ 210/639
4,670,150  6/1987  Hsiung et al. ..................... 210/636

FOREIGN PATENT DOCUMENTS 1249119  10/1989  Japan .

OTHER PUBLICATIONS

L. P. Buckley et al., "A Laboratory-Scale Study of a Process for Contaminant Removal and Waste Volume Reduction to Remediate Groundwater Containing Mixed Waste", Paper presented and appeared in the Proceeding of First International Mixed Waste Symposium, Baltimore, Md., Aug. 26–29, 1991.

L. P. Buckley et al., "Treatment of Groundwater and Soil-Wash Leachate Solutions Containing Mixed Waste Contaminants", Paper submitted for presentation and inclusion in the Proceedings of SPECTRUM '92: Nuclear and Hazardous Waste Management International Meeting, Boise, Id., Aug. 23–27, 1992.

*Primary Examiner*—Ivars Cintins
*Attorney, Agent, or Firm*—Daniel D. Park; Thomas G. Anderson; William R. Moser

[57] ABSTRACT

In processes of this invention aqueous waste solutions containing a variety of mixed waste contaminants are treated to remove the contaminants by a sequential addition of chemicals and adsorption/ion exchange powdered materials to remove the contaminants including lead, cadmium, uranium, cesium-137, strontium-85/90, trichloroethylene and benzene, and impurities including iron and calcium. Staged conditioning of the waste solution produces a polydisperse system of size enlarged complexes of the contaminants in three distinct configurations: water-soluble metal complexes, insoluble metal precipitation complexes, and contaminant-bearing particles of ion exchange and adsorbent materials. The volume of the waste is reduced by separation of the polydisperse system by cross-flow microfiltration, followed by low-temperature evaporation and/or filter pressing. The water produced as filtrate is discharged if it meets a specified target water quality, or else the filtrate is recycled until the target is achieved.

13 Claims, 1 Drawing Sheet

WASTE TREATMENT PROCESS FOR REMOVAL OF CONTAMINANTS FROM AQUEOUS, MIXED-WASTE SOLUTIONS USING SEQUENTIAL CHEMICAL TREATMENT AND CROSSFLOW MICROFILTRATION, FOLLOWED BY DEWATERING

CONTRACTUAL ORIGIN OF THE INVENTION

The United States Government has rights in this invention pursuant to Contract No. W-31-109-Eng-38 between the United States Department of Energy and the University of Chicago. This invention was conceived under subcontract 02112415 to Argonne National Laboratory from the University of Chicago.

FIELD OF THE INVENTION

This invention is concerned with improvements in or relating to aqueous waste treatment processes for waste volume reduction and removal of contaminants including lead, cadmium, uranium, cesium-137, strontium-85/90, trichloroethylene and benzene, and other metals including iron and calcium.

The purification of aqueous waste solutions containing heavy metals, radionuclides and trace levels of organic contaminants can be achieved by a variety of methods. One such method involves the use of standard unit operations including precipitation, clarification, thickening, filter pressing of sludge, sand-bed filtration, fixed-bed ion exchange, granular activated carbon adsorption, evaporation and neutralization techniques. To manage the secondary effluents generated, additional process steps such as sludge solidification/immobilization and organic oxidation/destruction must be considered.

As the treatment process is targeted to treat low levels of radioactivity and volatile organics, it is essential to minimize fugitive emissions and other uncontrolled losses. Processes based on standard unit operations are generally suited for fixed and centralized installations. They are not generally satisfactory for site remediation applications, where transportability and ease of operation are desirable.

It is an object of the claimed invention to combine chemical treatment with microfiltration processing to treat groundwater, leachate from contaminated soil washing, surface and run-off waters contaminated with toxic metals, radionuclides and trace amounts of organics from variety of sources. The process can also be used to treat effluents from industrial processes such as discharges associated with smelting, mining and refining operations. Influent contaminants amenable to treatment are from a few mg/L to hundreds of mg/L. By selecting appropriate precipitation, ion exchange and adsorption agents and conditions, efficiencies greater than 99.9 percent can be achieved for removal of contaminants. The filtered water for discharge can be targeted with either an order of magnitude greater or lower than contaminant levels for drinking water.

REVIEW OF THE PRIOR ART

The use of a "fixed-bed" configuration for adsorption/ion exchange has been the accepted practice in the process industry. A fixed-bed configuration is appropriate when multiple equilibrium stages are required within the adsorption/ion exchange unit to achieve a specific removal target. Invariably, a larger particle size of adsorbent is used and the bed is regenerated after exhaustion. In this way, the adsorbent material is reused for several cycles until it loses its ability to perform. Nevertheless, the material has to be eventually disposed of. In chemical engineering such an operation is referred to as "continuous" or "differential" processing.

For example, if one considers precipitation metals only, the time factors involved in the conventional process step may be summarized as follows:

| Precipitation Chemical Addition & Mixing | Flocculent Addition & Mixing | Gravity Settling/ Sludge Thickening/ Clarification | Final Sludge De-watering |
|---|---|---|---|
| $-t_1-$ | $-t_2-$ | $-t_3-$ | $-t_4-$ |

Approximate values of the different time factors are: $t_1$ is about 5 minutes to 60 minutes; $t_2$ is about 5 minutes to 30 minutes; $t_3$ is about 1 hour to 10 hours; $t_4$ is about 5 minutes to 60 minutes.

Overall processing time to produce metal sludge (30 to 60% by weight) = $t_1 + t_2 t_3 + t_4$. In reality, the actual precipitation time includes $t_1$, $t_2$ and a portion of $t_3$ (used to allow particle growth to flocs and floc growth to aid settling). As a result, the precipitation time is on the order of many hours.

SUMMARY OF THE INVENTION

The sequential process involving chemical treatment combined with the microfiltration process has a number of advantages over conventional processes. The combined action of precipitation, coprecipitation, adsorption and ion exchange, and cross-flow microfiltration removes contaminants effectively into a concentrated suspension while generating quality effluent appropriate for discharge. Another advantage is that there is direct contact of contaminants to the combined influence of iron and other metal precipitates, and powdered adsorbent and ion exchange materials. It is also an advantage that low-cost waste by-products of ion exchange/adsorbent materials are employed.

Yet another advantage is that cross-flow microfiltration with an air backwash system makes the process suitable for continuous operation and demands less space than conventional systems. Also, the process reaches steady state quickly and modular construction yields a large range of flow rate options and portability. The process is sufficiently generic to permit treatment of waste solutions containing a variety of radioactive and hazardous species.

Another advantage of the present invention is that powdered ion exchange/adsorbent materials provide high contaminant removal efficiencies and fast kinetics. For example, in the case of metal removal only, time factors involved in the process of the present invention are given as follows:

| Precipitation Chemical Addition & Mixing | Cross-Flow Microfiltration | Final Sludge Dewatering |
|---|---|---|
| $-t_1-$ | $-t_2-$ | $-t_3-$ |

Approximate values of time factors (based on pilot-scale and optimization tests) are: $t_1$ is about 15 minutes to 1 hour; $t_2$ is about one hour; $t_3$ varies depending on the technique employed from minutes to hours. Thus, the present invention is far better than conventional processes.

It is important to note that microfiltration using a 0.2 μm cut-off pore-size membrane does not require large particle size solids for solid-liquid separation. Thus, the lengthy times needed to produce flocs can be substantially reduced. The only growth required is that the final precipitate particle size must be slightly greater than the membrane cut-off pore size. Consequently, through a proper adjustment of the solution pH, the required particle size for microfiltration can be achieved within one hour.

Another advantage arises if a specific application demands the use of sulfide precipitation, this makes the case for microfiltration processing even more attractive. It should be also noted that even relatively difficult to dewater hydroxide metal precipitates can be handled using cross-flow microfiltration combined with air backwashing.

DETAILED DESCRIPTION OF THE INVENTION

Figure 1:
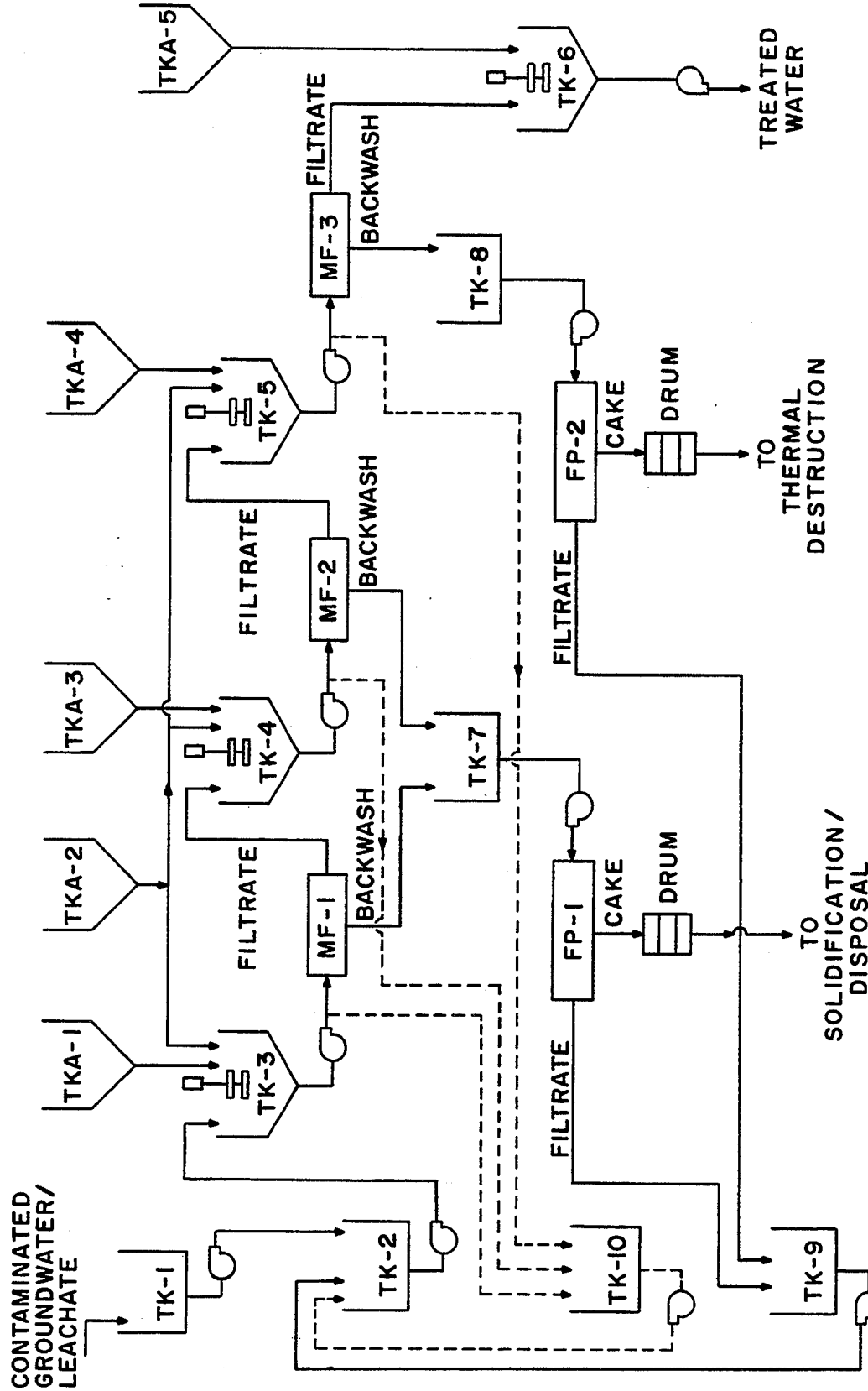
FIG. 1 is a schematic of a chemical treatment-microfiltration process whereby contaminants from all three classes, namely heavy metals, radionuclides and organics, are present in the feed water.

The invention described is a generic process that uses sequential cross-flow microfiltration to separate size-enlarged contaminant ions from waste solutions. The size enlargement is carried out sequentially by precipitation, and ion exchange and adsorption by direct addition of powdered materials.

As the goal is to remove three classes of contaminants, namely heavy metals, radionuclides and organics, a sequential scheme of three chemical conditioning steps is employed. The combination of the sequential chemical conditioning steps with sequential microfiltration separation for a complex waste feed is the novelty of this process.

The process is not intended for simple-to-treat, large volume waste streams. The process is focused towards applications demanding simplicity, controllability, portability and adaptability.

The process configuration is simple to operate and control, modular to facilitate easy scale-up, and can be portable for use in site remediations. Furthermore, the process is sufficiently generic so that it can be used for a variety of applications involving a wide spectrum of waste contaminants and composition. The process uses common, low-cost chemical agents and waste by-products. The target of this process is to allow for small to medium scale waste processing applications involving waste feed flow rates in the range of 50 to 300 gpm.

Included in this process is the removal of impurities such as calcium and iron from the feed solution to be treated, as they are common in groundwaters and leachants produced as a result of chemical leaching of contaminated soils. Since the iron hydroxide/iron oxide system is well known for its scavenging and coprecipitation actions on metal cations, consideration was given to including the addition of small quantities of iron to the waste. Iron is well known as an absorbent. As the iron precipitates it will react with and remove other contaminants. Thus, in the present invention further precipitation occurs without adding additional reagents. Thereafter, the iron is effectively removed in the microfiltration step. Tests have shown consistent removal of iron one order of magnitude below the drinking water limit. For the type of conditioning and filtration performed, iron precipitates are readily and efficiently removed by this process.

The presence of calcium in the feed is not desirable as calcium and strontium isotopes (strontium-90, strontium-85) behave similarly under precipitation, ion exchange and adsorption conditions. If calcium is not removed, then the radioactive strontium particles cannot be sufficiently removed to achieve the desired quality of the water discharged. Generally, the concentration of calcium is tens and hundreds of parts-per-million while radioactive strontium occurs in concentration levels of parts-per-million to parts-per-billion levels. With this incompatibility and stringent standards for radioactive strontium discharge levels (e.g., U.S. drinking water limit: [Sr-90]=0.35 Bq/L; [Sr-85]=150 Bq/L), it makes the flowsheet design even more difficult.

Cadmium removal is included in this process to cover a broader range of heavy metals. In hydroxide precipitation, cadmium is precipitated essentially completely around a solution pH of 11, while other metals are precipitated around a pH value of 9.

The process operation involves single stage or multistage chemical treatment-microfiltration, depending on the waste type and composition. For water containing only heavy metals as contaminants, a single-stage treatment process is required. However, where the water contains all three families of waste, heavy metals, radionuclides and organics, a three-stage chemical treatment combined with microfiltration is required.

FIG. 1 shows a schematic of a treatment flowsheet developed on the basis of the bench-scale and pilot-scale results. This process flowsheet, consisting of sequential chemical treatment combined with a three-stage microfiltration and a dewatering step, represents the present invention for effective treatment of mixed-contaminant waste solutions containing all three families of contaminants, heavy metals, radionuclides, and organics. The flowsheet design also includes an optional dewatering step that uses a filter press to concentrate suspension generated by the third process step involving small amounts of volatile organic contaminants.

The process of the invention for treatment of water containing all three families of waste, as shown in FIG. 1, is fully described below.

The waste water enters the prefilters from the collection tank TK-1, where coarse suspended particles are removed. The filtered water is then routed, into the equalization tank TK-2 and then to the conditioning tank TK-3. In the conditioning tank TK-3 the solution pH is adjusted by the addition of a base, such as lime, from TKA-1 to precipitate heavy metals. Following precipitation, a sequential addition of a powdered ion exchange material, such as a natural zeolite, from TKA-2 is carried out to remove residual heavy metal ions and a minor portion of the dissolved radionuclides.

The conditioned feed from TK-3 is fed to the first stage microfiltration MF-1 in which the suspended metal precipitates and ion-exchanged zeolite particles are separated. The filtrate generated from the first stage microfiltration MF-1 is continuously withdrawn and held in a first holding tank TK-4 where it is chemically precipitated with reagents such as sodium carbonate ($Na_2CO_3$) to remove the majority of calcium and radioactive strontium. Following this, another sequence of zeolite powder addition from TK-2 is made to remove the majority of the radionuclides. The dilute slurry is separated in the second-stage microfiltration MF-2. The filtrate from the second-stage microfiltration is delivered to the adsorption/ion exchange tank TK-5 and conditioned with a last sequence of any powdered adsorbent, such as activated carbon from TKA-4, and some zeolite from TKA-2 to remove all residual activity and organic contaminants.

The dilute slurry from the adsorption/ion exchange tank TK-5 is separated in the third-stage microfiltration MF-3. The filtrate from the third-stage microfiltration is continuously withdrawn and delivered to the neutralization tank TK-6. After pH adjustment by the addition of an acid from TKA-5 (if needed) and after monitoring of the contaminants for acceptable levels, the treated water is discharged from the neutralization tank TK-6.

The concentrate streams from the three microfiltration units (MF-1, MF-2 and MF-3) are routed to the dewatering systems comprising a filter press FP-1 and FP-2 and/or a low-temperature evaporation unit (not shown) for further volume reduction. The sludge generated from the dewatering step is the sole residue of the process and is solidified suitably for disposal. The filtrate from the dewatering step is collected in TK-9 and recycled, if necessary, back to the first stage of microfiltration, or else it is discharged, The processes of this invention have been applied to the various specific waste streams. Below are listed certain process equipment used for testing of the invention.

Groundwater samples for a bench-scale treatability test program were collected from observation wells fitted with intake screens. Polyethylene plezometers with fritted polyethylene intakes were used. For pilot-scale study, groundwater was pumped to the treatment facility from the collection well. Simulated waste solutions were prepared using high purity chemicals, dissolving them in distilled-deionized water at a pH value of less than or equal to 2. The process tests involved mainly a chloride medium. The starting chemical compounds were high purity metal chlorides, except for strontium and uranium, in which case strontium nitrate and uranium oxide ($UO_3$) were used. In the case of organics, high purity benzene and trichloroethylene from the same source were employed. Distilled-deionized water having minimal electrical conductivity was used to dissolve the chemicals at the desired stock solution concentration to prepare simulated waste feed solutions. Stock and feed solutions containing organics were freshly-prepared before use. The test feed solution was sampled and analyzed for the actual contaminant concentration during each test.

The following process target indicators were used to assess the effectiveness of the process.

(1) Produced Water Quality Index (PWQI):

This indicator determines the "quality" of the outgoing water stream from the process and denotes the effectiveness of the process. To evaluate the quality, the U.S. drinking water limit was employed as a reference. PWQI is defined as the ratio of the concentration of contaminants in the treated water (filtrate) from the process to the concentration of the contaminant allowed for drinking water.

(2) Percent Contaminant Removal Efficiency (PCRE):

The contaminant removal efficiency of the process as a percentage of the feed stream concentration is defined as a ratio of the product water quality index (PWQI) and the feed water quality index FWQI:

$$PCRE = [1-(PWQI/FWQI)] \times 100$$

where, FWQI is equal to the ratio of the concentration of contaminant in the feed to that corresponding to the drinking water standard.

(3) Volume Reduction Factor (VRF) & Concentration Factor (CF):

The volume reduction factor is determined by the ratio: [Total feed volume]/[Final concentrate volume]. The concentration factor is similar to the volume reduction factor and is determined using a concentration value for specific chemical species in the feed and concentrate streams. Standard, commercially available equipment was used in the tests.

I. Apparatus

A. Benchscale: Microfiltration

In the initial phases of the project, batch membrane cells were used. The cells had capacities of 50 mL and 200 mL and were purchased from Amicon. The batch cell consisted of a special membrane holder to allow for easy insertion or removal of the membrane without damage. The beaker-design allowed the sample to be poured in and out easily and to provide maximum recovery and virtually no fluid loss. The stirring bar configuration facilitated efficient stirring of the sample. The cell configuration gave minimal liquid holdup volume. Flat-sheet polypropylene microfiltration membranes with an average pore diameter of 0.2 $\mu m$ were used to conduct screening studies.

B. Pilot-Scale Apparatus

1. Microfiltration System

The Microcompact MEMCOR microfiltration system (models 620044 and 696906) were specially designed for the project and were purchased from Memtec America. The system is a continuous cross-flow microfiltration unit and utilizes a gas backwash system to provide reliable operational performance. The heart of the unit is a set of 4 polypropylene hollow-fiber membrane cartridges with an average pore-size of 0.2 $\mu m$ and a total filter area of 4 $m^2$. The unit was designed to provide nominal filtration rates of 2 to 3 gpm. By passing unfiltered feed solution over and around the hollow fibers, the suspended particles are built up on the outside of the fiber while clean filtrate passes through the membrane wall into the hollow center of the fiber. The unfiltered portion of the feed-stream is returned to the feed tank in a more concentrated form. To maintain the processing rate a gas backwash system is used. High pressure air is periodically forced from the center of the fibers back across the membrane thereby expanding the fiber and allowing air to remove rejected material from the outside of the fiber. Generally, the time period between backwashes is set with a timer. Typically, a waste volume reduction factor of 20 was achieved.

2. Dewatering Equipment a. Low-Temperature Evaporation Unit

The low-temperature evaporation unit was used to assess the effectiveness of dilute suspension streams produced by microfiltration. The evaporation was carried out at temperatures between 5° C.(~40° F.) and 20° C. (65° F.). The unit was specially designed for the project to vary the evaporation temperature. The Calfran Unit APTU-025 is capable of producing about 25 U.S. gallons per day of clean distillate from a feed containing waste water. In the operation of the unit, the vacuum pump removes the air from the system causing the boiling point of the waste water in the range of 45° to 65° F. As the waste water boils at this temperature, pure water vapor is generated leaving the impurities behind in the vaporizer. The water vapor travels to the condenser and the condensed liquid water on the cold coil (cooled by a refrigerant) is periodically and automatically removed by a pump. The heat given up by the condensing water vapor evaporates the liquid refrigerant inside the coil. The gaseous refrigerant produced is then compressed. The heat contained in the gaseous refrigerant is then transferred back to the waste water in the vaporizer. This completes the energy reuse cycle for the gaseous refrigerant. The concentrate in the vaporizer is manually drained.

b. Filter Press System

The filter press system, called the Exxpress unit (model STP), was purchased from EPOC Water, Inc. The principal component of the system is a woven filter cloth configured into a tubular array. The STP unit consists of a single tubular filter (2.5 cm. dia by 2.4 m long). The dewatering of dilute slurry occurs inside the tubular filter (module). The module is held by resin manifolds at each end to provide for flow entry and exit. When a dilute slurry is introduced into the module under pressure, the liquid permeates through the tube walls and the suspended solids are retained, forming a layer on the internal surface of the filter tube. The dewatering cycle is completed when the solid layer reaches a controlled thickness. The cake discharge (flush cycle) then commences by opening the module reject valve and traversing the module with squeeze rollers which removes the cake from the tube wall. The cake solids are transported out of the module by means of the flush liquid and are separated by a sieve-end separating screen. The module is effectively cleaned during each cake discharge cycle by the flush rollers and by the action of the flush liquid.

c. Reagents and Supplies

All chemical reagents employed in the experimental program were of analytical analar grade. The ion exchange material was a natural zeolite from Steelhead Speciality Minerals. Two types of zeolite were used: one was TSM-140 D with a $-35/+40$ mesh size and the second was a powdered ($-325/+400$ mesh size) product, TSM-140 H. This product is known for its ion exchange properties, especially for cesium and divalent cations. The solid density and the bulk density of the zeolite were 1600 kg/m$^3$ and 720 to 1280 kg/m$^3$, respectively. The powdered ($-325/+400$ mesh size) activated carbon from Calgon Carbon Corporation (Type BPL) and from Darco G-60 were employed in the organic removal experiments.

II. Test Procedure

A. Chemical Treatment-Microfiltration

For bench-scale tests, a waste feed solution of known pH and contaminant concentration was prepared and fed to the membrane static cell containing the flat-sheet membrane. The feed pressure was maintained at about 10 psig by a nitrogen gas cylinder. The temperature of the operation was kept at room temperature (~23±2° C.). During membrane filtration, the feed solution was stirred by a magnetic stirrer bar that is equipped as part of the cell. A fixed volume of the permeate solution was collected (e.g., 180 mL for the large cell and about 45 mL for the small cell), and the time taken to collect the fixed volume was also recorded. Samples of the starting feed solution and the fully mixed filtrate/permeate solution were taken at the end of the run and analyzed for contaminants.

In a typical pilot-scale operation involving the Memcor microfiltration unit, the conditioned waste feed was introduced to the microfiltration system via a prefilter/strainer (100 $\mu$) and feed pump. The conditioning of the feed solution includes chemical treatment involving solution pH adjustment, addition of adsorbent/ion exchange powder, etc. The pilot-scale experiments involving chemical treatment combined with microfiltration was performed using waste solution batch sizes of 400 to 2000L. Chemical conditioning of the waste was achieved with mechanical agitation in combination with closed-loop recirculation of the tank contents by means of a pump. The microfiltration of the conditioned waste solution was performed at a transmembrane pressure in the range of 7.5 to 15 kPa [transmembrane pressure=(Feed pressure+recirculation pressure/2)−filtrate pressure]. By maintaining a constant filtration rate, the transmembrane pressure was essentially fixed for a given test. The microfiltration unit was operated in a "concentration mode," in which the filtrate was continuously withdrawn while the cross-flow (concentrate stream) returned to the feed tank. All the experimental data reported were obtained at a filtration rate of 2 gpm and a set volume reduction factor of 20.

B. Low-Temperature Evaporation

The low-temperature evaporation experiments were performed using two modes of operation: 1) continuous-feed, combined with continuous and batch evaporation mode; and 2) batch-feed with batch evaporation mode. For the continuous-feed operation, the external feed tank was employed, and for batch-feed operation the vaporization vessel was used as the feed holding tank. For continuous-feed operation the desired synthetic waste solution was prepared and charged to the external feed tank. Typically, a volume of up to 100 liters was used in the experiments. By deploying a vacuum lift, the vaporizer tank was filled to the predetermined level with the feed solution. The feed was evaporated until the desired volume reduction was reached in the vaporizer tank. The batch-feed evaporation was identical to the continuous-feed mode of operation except that no external feed tank was employed. The starting waste feed was fed to the vaporizer (usually about 14 liters) and evaporated until the desired volume reduction of the waste feed was achieved.

During the evaporation test, samples of the feed, concentrate and condensed over-head streams were taken at prespecified time intervals to determine contaminant concentration. In addition, all the pressure and temperature readings were recorded as a function of evaporation time. In many tests, the different samples were also analyzed for electrical conductivity.

C. Filter Pressing

The dewatering process consists of sequential cycles of loading the filter module followed by cake discharge/flushing of the cake solids to the separating screen. The load cycle was controlled by a timer mounted on the panel. At the conclusion of the load cycle, the cake discharge cycle commenced and the cake solids transported from the filter module by the flush liquid and collected on the separating screen. On completion of the flush cycle, the module was again put into its load cycle. Usually, waste feed suspensions containing 1 to 5 wt. % solids in 50L batches were treated.

D. Process System Monitoring

Typically, the pH of the feed solution was measured before the solution was chemically conditioned, and before and after it was processed by microfiltration, evaporation and by filter pressing. In bench-scale microfiltration tests, the filtrate rate was measured when samples were collected for contaminant analysis. In pilot-scale tests involving microfiltration, and dewatering by low-temperature evaporation and filter-pressing operations, the feed, concentrate and filtrate samples for analysis were collected via designated sample ports located on the flow lines. In mass balance experiments, the individual influent and effluent streams were collected in preweighed tanks for predetermined time periods and the mass of streams were determined using a calibrated weight scale.

The filtration rate was measured in units of mL/s or L/min, using precalibrated rotameters and by weighing the total mass of filtrate collected over a period of specified duration. This procedure was implemented routinely for every test. The evaporation rate (overhead condensate flow rate) was determined by measuring the condensed overhead stream volumetrically and/or gravimetrically for a specified duration.

E. Sampling and Analysis

Samples of the waste feed and treated solutions were collected for contaminant analyses. Wherever possible, the procedures used to analyze samples were adopted from standard U.S. Environmental Protection Agency methods. The following is a summary of analysis methods.

The precision in chemical analysis was determined by replicate experiments performed under identical conditions. The precision corresponds to twice the standard deviation (2s) representing a 95% confidence level. The particle size of adsorbent/ion exchange material was not varied in the study. The median particle size was 20 $\mu$m and all particles were less that 44 $\mu$m in diameter. It was anticipated that the distribution of particle sizes in each batch of adsorbent would be slightly different. As the particle size effect was beyond the scope of the work package, errors associated with variations from test to test were not examined.

The conditioning time and intensity of mixing of reagents with the waste solution were important for the removal of contaminants by precipitation, ion exchange and by adsorption processes. The conditioning time does not include times associated with filtration of suspensions. In reality, however, a finite time is involved in the filtration stage and further transfer of contaminants may take place from the solution phase to the solid phase in the suspension. Since the conditioning time in the tank is much greater (e.g. >0.25 h) as compared with the instantaneous filtration time of a few minutes, it is expected that any error from the additional time, not included in the conditioning time, will not be significant enough to influence the contaminant removal results.

| PROCEDURE | METHOD |
|---|---|
| Acid Digestion | EPA SW-846 3005* |
| Metals by ICPS | EPA SW-846 6010 |
| —Cd | |
| —Pb | |
| —Ca* | |
| —Fe | |
| —U* | |
| $^{90}$Sr by beta counting of $^{90}$Y extracted by HPLC | WL-AM-141 |
| $^{90}$Sr by Cerenkov counting | ** |
| $^{90}$Sr by total beta counting | *** |
| Radionuclides by Gamma Spectrometry | |
| —$^{85}$Sr | WL-AM-123 |
| —$^{137}$Cs | WL-AM-123 |
| Organics by Direct Injection, GC/MS | EPA SW-846 8260* |
| Organics by Purge & Trap, GC/MS | EPA SW-846 8260* (WL-WN500B, WL-WN530B) |

*modified;
, *Methods introduced during test work; EPA: U.S. Environmental Protection Agency; WL: Whiteshell Laboratories Procedure, AECL, Pinawa, Manitoba, Canada ROE 1LO.

The mixing of the solution was performed by bulk agitation with similar mixing intensities between experiments. The mixing intensity was not measured. Although micromixing is known to influence precipitation processes, such effects were not expected to be dominant in the current experiments.

Filtration tests had indicated that the quality of the filtrate was influenced by the filtrate and concentrate flow rates. For this reason, all tests were conducted at constant filtrate and concentrate flow rates. The uncertainty in the flow rate measurements of about 5% was not significant to impact the test results.

The processes, equipment, and the parameters selected for the equipment which have been described in reference to the above preferred embodiments are intended to be illustrative rather than limiting. Various changes and modifications may be made without departing from the spirit and scope of the invention as defined in the following claims.

What is claimed is:

1. A waste treatment process for removal of contaminants including metals, radionuclides and organic matter from a feed of water containing contaminants including metals, radionuclides and organic matter, comprising the following steps:
   treating said feed of water with a base, a powdered ion-exchange material, sodium carbonate, and a powdered adsorbent to remove contaminants; and
   separating suspended solids, produced from the treatment, from said feed by passing said feed through a crossflow microfiltration means.

2. A waste treatment process of claim 1 wherein said base is lime, said powdered ion-exchange material is zeolite, and said powdered adsorbent is activated carbon.

3. A waste treatment process for removal of contaminants including metals, radionuclides and organic matter from a feed of water containing coarse particles, calcium and contaminants, said contaminants including metals including heavy metals, radionuclides and organic matter, comprising the following steps:
   removing coarse particles suspended in said feed of water by passing said feed through a filter;
   precipitating metals including heavy metals from said feed of water by the addition of a base;
   sorbing residual dissolved heavy metals and a portion of any dissolved radionuclides from said feed by adding an ion-exchange material;
   separating metal precipitates and ion-exchange particles from said feed by a first stage crossflow microfiltration;
   precipitating calcium and a portion of radioactive strontium from said feed by adding soda;

sorbing a portion of radionuclides from said feed by adding an ion-exchange material;

separating calcium and strontium precipitates, radionuclides and ion-exchange particles from said feed by a second stage crossflow microfiltration;

removing residual radionuclides and organic contaminants from said feed by adding activated carbon and ion-exchange material;

separating said organic contaminants from said feed by a third stage crossflow microfiltration.

4. A process of claim 3 further comprising the step of neutralizing the pH level of said feed to a value suitable for waste water discharge.

5. The process of claim 3 further comprising the step of dewatering a concentrate stream from each of the crossflow microfiltration means.

6. A waste treatment process for removal of contaminants including metals, radionuclides and organic matter from a feed of water containing coarse particles, calcium and contaminants, said contaminants including metals, radionuclides and organic matter, comprising the following steps:

precipitating contaminants from said feed of water by adding a base to said feed of contaminated water;

sorbing contaminants from said feed of water by adding an ion-exchange material;

precipitating calcium and contaminants from said feed by adding soda;

adsorbing contaminants from said feed of water by adding a powdered adsorbent; and separating suspended particles, produced by the addition of said base, ion-exchange material, soda, and adsorbent, from said feed of water by passing said feed through a crossflow microfiltration means.

7. A process of claim 6 further comprising the step of neutralizing the pH level of said feed to a value suitable for waste water discharge.

8. A process of claim 6 wherein said contaminants precipitated, sorbed by ion-exchange and adsorbed from said feed are removed by passing said feed through a crossflow microfiltration means prior to additional precipitation, sorbing by ion-exchange and adsorption of any remaining contaminants.

9. A process of claim 6 further comprising the step of dewatering a concentrate stream from the crossflow microfiltration means.

10. The process of claim 6 wherein said ion-exchange material includes zeolite.

11. The process of claim 6 wherein said powdered adsorbent includes activated carbon.

12. The process of claim 6 wherein said suspended particles include heavy metals, metals, radionuclides, organic matter, calcium, soda, ion-exchange material, and activated carbon.

13. The process of claim 6 further comprising the steps of filtering coarse suspended particles in said feed of contaminated water and sampling said feed for analysis of the contaminants prior to the removal of said contaminants.

* * * * *